United States Patent [19]

Fukui et al.

[11] Patent Number: 5,109,056
[45] Date of Patent: Apr. 28, 1992

[54] POLYPROPYLENE MOLDED ARTICLE

[75] Inventors: Yoshiharu Fukui; Kazuhisa Kuroda, both of Ichihara, Japan

[73] Assignee: Sumitomo Chemical Company, Limited, Osaka, Japan

[21] Appl. No.: 614,245

[22] Filed: Nov. 16, 1990

Related U.S. Application Data

[63] Continuation-in-part of Ser. No. 406,740, Sep. 13, 1989, abandoned.

[30] Foreign Application Priority Data

Sep. 19, 1988 [JP] Japan .................. 63-234385

[51] Int. Cl.⁵ .................................. C08K 5/00
[52] U.S. Cl. ..................................... 524/583
[58] Field of Search ........................... 524/583

[56] References Cited

U.S. PATENT DOCUMENTS 4,365,057 12/1982 Saito et al. .................. 528/480

FOREIGN PATENT DOCUMENTS

| 0006421 | 1/1980 | European Pat. Off. . |
| 0047077 | 3/1982 | European Pat. Off. . |
| 104145 | 8/1985 | Japan . |
| 21245 | 5/1986 | Japan . |
| 195141 | 8/1986 | Japan . |

*Primary Examiner*—Joseph L. Schofer
*Assistant Examiner*—Mark Sweet
*Attorney, Agent, or Firm*—Birch, Stewart, Kolasch & Birch

[57] ABSTRACT

Disclosed herein is a polypropylene molded article characterized in that the content of hexane and/or heptane therein is from 0.1 to 5 ppm and the content of 2,4-dimethyl-heptene-1 therein is from 0.1 to 5 ppm. It has a greatly lowered level of odor and hence is suitable for food packaging.

5 Claims, 3 Drawing Sheets

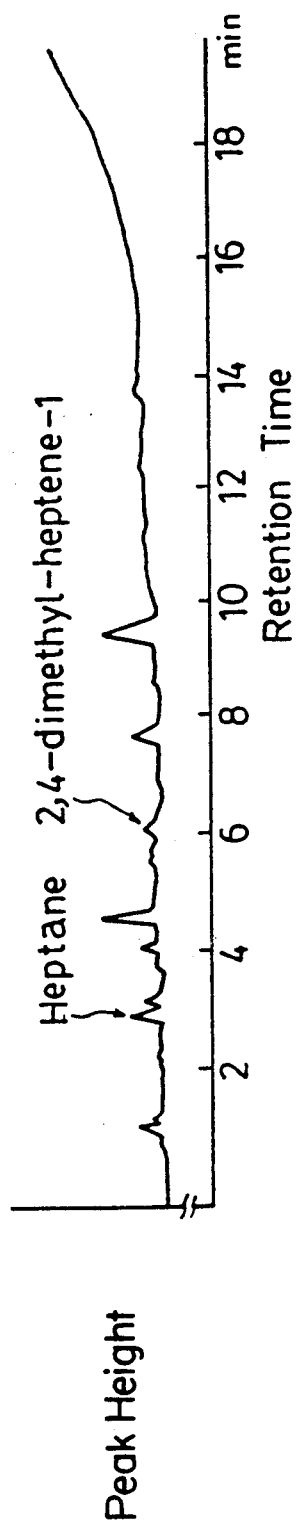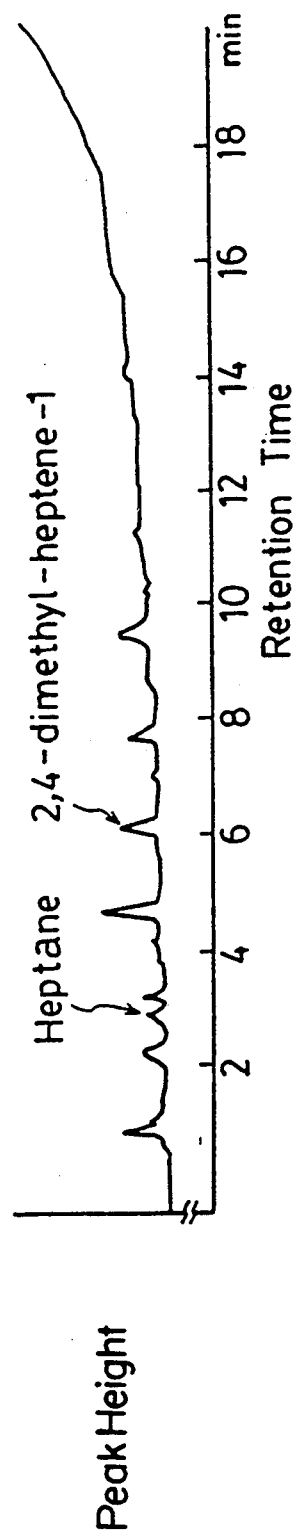

POLYPROPYLENE MOLDED ARTICLE

The present application is a continuation-in-part application of Ser. No. 07/406,740, filed Sep. 13, 1989, which is expressly incorporated by reference herein.

BACKGROUND OF THE INVENTION

1. Field of the Invention

The present invention relates to a polypropylene molded article having a greatly lowered level of odor, and more particularly, it is concerned with a polypropylene molded article suitable for food packaging.

2. Description of the Prior Art

Polypropylene is widely used alone or in the form of blend with other resins to produce film, extruded articles, and injection-molded articles on account of its superior mechanical properties, moldability, and appearance. Unfortunately, molded articles produced from polypropylene have a characteristic odor which poses a serious problem when they are applied to food packaging containers and bags and food storage containers. This odor has an adverse effect on the flavor of foods and deteriorates the value of foods and diminishes the appetite. Therefore, there has been a strong demand for the reduction of this odor.

Possible causes of odors are residues of the volatile solvents (hexane and/or heptane) used in the production of polypropylene, additives (such as antioxidant) in polypropylene, and decomposition products of polypropylene which occur during heating, melting, and molding. These volatile substances stimulate the human's keen sense of smell however small they might be in the molded articles of polypropylene used for food packaging.

There are some known methods of lowering the level of odor by drying polypropylene powder (Japanese Patent Laid-open No. 75410/1980), by using a vented extruder for the pelletization of polypropylene powder and adding a specific additive to polypropylene (Japanese Patent Laid-open Nos. 104145/1985 and 195141/1985). These methods, however, do not provide polypropylene molded articles which have a very low level of odor required for food packaging. To address this problem, the present inventors carried out extensive studies and completed the present invention.

SUMMARY OF THE INVENTION

The gist of the present invention resides in a polypropylene molded article characterized in that the content of hexane and/or heptane therein is from 0.1 to 5 ppm and the content of 2,4-dimethyl-heptene-1 therein is from 0.1 5 ppm.

BRIEF DESCRIPTION OF THE DRAWINGS

FIG. 1 is a gas chromatogram obtained in Example 1.
FIG. 2 is a gas chromatogram obtained in Example 2.

DETAILED DESCRIPTION OF THE INVENTION

Figure 3:
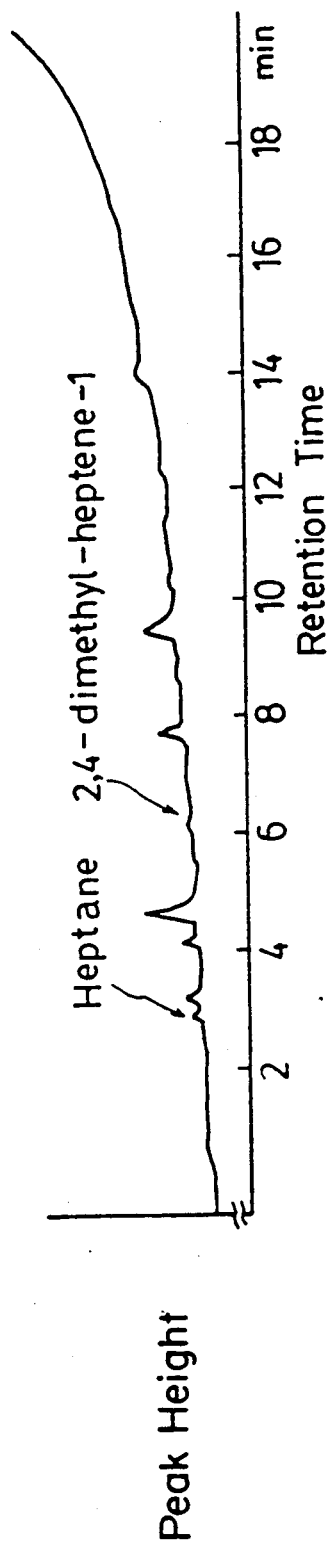
FIG. 3 is a gas chromatogram obtained in Example 3.

Polypropylene is produced industrially in large quantities by slurry polymerization, bulk polymerization, or gas-phase polymerization using a Ziegler-Natta catalyst and a hydrocarbon medium such as hexane and/or heptane. It is usually obtained in the form of powder, and the powder is processed into molded articles directly or after pelletization.

During the molding process, polypropylene undergoes a great deal of thermal and mechanical stress and hence partly decomposes to give degradation products They are a cause of the characteristic odor of polypropylene molded articles. They include a variety of hydrocarbon compounds, typical of which is 2,4-dimethyl-heptene-1. The present invention is based on the finding that it is possible to greatly lower the level of odor of polypropylene molded articles by reducing the content of 2,4-dimethyl-heptene-1 (as one of the degradation products of polypropylene formed during molding process) and the content of hexane and/or heptane (used as the solvent in the production of polypropylene). The invention will be described in more detail in the following.

The term "polypropylene" used in the present invention to denote the resin component of the polypropylene molded article embraces not only propylene homopolymers but also binary or ternary random copolymers and block copolymers of propylene with $\alpha$-olefins such as ethylene, butene-1, hexene-1, and 4-methylpentene-1. It also includes polypropylene resin composition formed by blending the above-mentioned propylene-containing polymers with one or more of polyethylene, polybutene-1, poly-4-methylpentene-1, petroleum resin, and synthetic rubbers (such as ethylene-propylene copolymer rubber, ethylene-butene-1 copolymer rubber, ethylene-propylene-nonconjugated diene copolymer rubber, polybutadiene, polyisoprene, styrene-butadiene rubber, styrene-butadiene-styrene block copolymer, styrene-isoprene-styrene block copolymer, and styrene-ethylene-butylene-styrene block copolymer). The polypropylene molded article of the present invention includes containers, films, and sheets (primary molded articles) formed from the above-defined polypropylene by T-die film extrusion, tubular film extrusion, uniaxial orientation, biaxial orientation, calendering, injection molding, blow molding, injection blow molding, etc. It also includes secondary molded articles such as food packaging bags and food storage containers formed by fabricating the primary molded article alone or laminating it with other films or sheets.

For the polypropylene molded article of the present invention to have a very low level of odor, it is necessary that the content of 2,4-dimethyl-heptene-1 should be from 0.1 to 5 ppm, preferably from 0.1 to 3 ppm, and more preferably from 0.1 to 2 ppm, and the content of hexane and/or heptane should be from 0.1 to 5 ppm, preferably from 0.1 to 3 ppm, and more preferably from 0.1 to 2 ppm.

The object of the present invention is achieved when the content of 2,4-dimethyl-heptene-1 and hexane and/or heptane in the polypropylene molded articles are in the specific ranges. Reducing the total amount of volatile substances (including 2,4-dimethyl-heptene-1 and hexane and/or heptane) in the polypropylene molded article is an effective means to lower the level of odor of the polypropylene molded articles. Therefore, the total amount of volatile substances in the polypropylene molded article should be from 1 to 30 ppm, preferably from 1 to 25 ppm, and more preferably from 1 to 20 ppm.

The content of volatile substances (such as hexane, heptane, and 2,4-dimethyl-heptene-1) in the polypropylene molded article may be determined by gas chromatography using a fully automatic headspace analytical system consisting of a gas chromatograph (Model GC-9APF) and a headspace sampler (Model HSS-2A) (both made by Shimadzu Seisakusho Ltd.) Gas chromatography with this system is carried out in the following manner.

(1) A polypropylene molded article to be analyzed is cut into small pieces (several millimeters square) which are used as a sample. About 0.5 g of this sample is accurately weighed and charged into a 20-ml vial (sample bottle) under nitrogen. The sample bottle is set in the headspace sampler.

(2) After thermostating the sample bottle at 150° C. for 60 minutes, 0.8 ml of the gas phase is taken by a gas-tight syringe and injected into the gas chromatograph for the anaylysis of volatile components.

(3) The concentration of the volatile components obtained by gas chromatography is converted into the amount of components in the gas phase and the converted value is divided by the weight of the sample to give the content of volatile substances in the molded article.

The polypropylene molded article of the present invention which has a lowered level of odor can be obtained by drying the polypropylene molded article, which may be in the form of powder, pellets, film, or sheet produced in the usual way, at a temperature higher than 50° C., preferably higher than 80° C., but lower than the melting point of polypropylene. This drying may be carried out by heating under a stream of an inert gas such as nitrogen or under reduced pressure. The drying time depends on the content of volatile substances; it is usually longer than 2 hours, preferably longer than 3 hours, and more preferably longer than 30 hours.

One way of lowering the level of odor of the polypropylene molded article is to reduce the degradation products which occur during molding process. This is accomplished by increasing the stability of polypropylene in molding process. The stability of polypropylene is easily evaluated by measuring the increase of melt flow rate (MFR) which takes place when polypropylene undergoes repeated pelletization. In other words, the stability is expressed by the k value in the following formula.

$$k = MFR_2 / MFR_0$$

where $MFR_0$ denotes an MFR of a polypropylene sample which has undergone pelletization only once, and $MFR_2$ denotes an MFR of the same polypropylene sample which has undergone repeated pelletization at a specified temperature (say, twice at 280° C.). The smaller the k value, the better the stability of polypropylene. The polypropylene in the present invention should have a k value smaller than 5.0, preferably smaller than 4.0.

The stability of polypropylene may be effectively increased by incorporating polypropylene with a variety of additives, especially antioxidants, such as phenol-type antioxidants, phosphorus-containing antioxidants, and tocopherols. It is desirable that the antioxidant itself have a low level of odor.

Preferred examples of phenol-type antioxidants including the following.
2,6-di-t-butyl-p-cresol (BHT),
octadecyl-3-(3,5-di-t-butyl-4-hydroxyphenyl)propionate,
pentaerythritol-tetrakis[3-(3,5-di-t-butyl-4-hydroxyphenyl)propionate],
triethyleneglycol-bis[3-(3-t-butyl-5-methyl-4-hydroxyphenyl)propionate],
1,3,5-trimethyl-2,4,6-tris(3,5-di-t-butyl-4-hydroxybenzyl)benzene,
tris-(3,5-di-t-butyl-4-hydroxybenzyl)isocyanurate,
2,2'-methylene-bis-(4-methyl-6-t-butylphenol),
2,2'-ethylene-bis-(4,6-di-t-butylphenol), and
3,9-bis[2-(3-(3-t-butyl-4-hydroxy-5-methylphenyl)propionyloxy)-1,1-dimethylethyl]-2,4,8,10-tetraoxaspiro[5.5.]undecane.

Preferred examples of phosphorus-containing antioxidants include the following.
tris(2,4-di-t-butylphenyl) phosphite,
tetrakis(2,4-di-t-butylphenyl)-4,4'-biphenylene phosphonite,
tris(nonylphenyl) phosphite,
distearylpentaerythritol diphosphite,
bis(2,4-di-t-butylphenyl)pentaerythriol diphosphite, and
bis(2,6-di-t-butyl-4-methylphenyl)pentaerythritol diphosphite.

Preferred examples of tocopherols include the following.
α-tocopherol, β-tocopherol, γ-tocopherol, and δ-tocopherol.

These antioxidants should be used alone or in combination with one another in an amount of 0.01 to 5 parts by weight, preferably 0.03 to 1 part by weight, for 100 parts by weight of polypropylene, so that the k value is lower than 5.

The polypropylene may be incorporated with, in addition to the above-mentioned antioxidant, other additives such as slip agent, antistatic agent, UV light absorber, photostabilizer, filler, antiblocking agent, pigment, and coloring agent, according to need.

EXAMPLE

The invention will be descried in more detail with reference to the following Examples and Comparative Examples, which are not intended to restrict the scope of the invention.

EXAMPLE 1

An ethylene-propylene block copolymer (containing 5.0 wt % of ethylene) in the form of powder is prepared by slurry polymerization (in heptane) using a titanium trichloride-organoaluminum catalyst. This block copolymer (100 parts by weight) is incorporated with 0.05 parts by weight of calcium stearate, 0.1 parts by weight of "Irganox 1010" (trade name of pentaerythrityl-tetrakis[3-(3,5-di-t-butyl-4-hydroxyphenyl)propionate], made by Ciba-Geigy Corp.), 0.1 parts by weight of "Goodrite 3114" (trade name of tris(3,5-di-t-butyl-4-hydroxybenzyl)isocyanurate, made by B. F. Goodrich Chemical Co.), and 0.1 parts by weight of "Phosphite 168" (trade name of tris(2,4-t-butyl)phosphite, made by Ciba-Geigy Corp.). The resulting composition is pelletized at 230° C. using a vented extruder (40 mm in diameter). The pelletized composition has an $MFR_0$ of 3.0 g/10 min.

The pellets undergo repeated pelletization twice at 280° C. using a vented extruder (40 mm in diameter) running at 50 rpm. The composition after repeated pelletization has an MFR$_2$ of 5.7 g/10 min, and the k value is 1.9.

The pellets of the composition before the repeated pelletization are dried under educed pressure in a large-size drier at 130° C. for 4 hours. The dried pellets are extruded at a stock temperature of 230° C. from a 50-mm extruder equipped with a T-die. The extrudate is cooled and solidified with a cooling roll at 25° C. Thus there is obtained a 30-μm thick undrawn film.

This film is tested for volatile substances in the following manner using a fully automatic headspace analyzing system composed of a gas chromatograph (GC-9APF) and a headspace sampler (HSS-2A) (both made by Shimadzu Seisakusho Ltd.).

(1) The film sample (0.5 g) is cut into small pieces (several millimeters square) and the cut pieces are charged into a 20-ml vial under nitrogen. The vial is set in the headspace sampler.

(2) After thermostating the vial at 150° C. for 60 minutes, 0.8 ml of the gas phase is taken using a gas-tight syringe and injected into the gas chromatograph for the analysis of volatile substances.

(3) The analysis by gas chromatography is carried out under the following conditions.

Column ... Thermon 1000 25%, 3 mm (dia×3 m.
Column temperature ... 60° C.→230° C. at 5° C./min
Injection temperature ... 240° C.
Detection temperature ... 240° C.
Carrier gas ... N$_2$, 60 ml/min
Amounted injected ... 0.8 ml (4) The amount of volatile substances is expressed in terms of heptane.

The avove-mentioned procedure gives a gas chromatogram as shown in FIG. 1. It is noted that heptane is detected about 3 minutes and 2,4-dimethyl-heptene-1, about 6 minutes. The content of heptane in the film sample is 1.4 ppm and the content of 2,4-dimethyl-heptene-1 is 0.84 ppm, and the total amount of volatile components is 20 ppm.

The above-mentioned film sample is examined for odor by smelling air in a 250-ml wide mouthed bottle with a glass lid which is charged with 20 g of the film sample cut into small pieces (several millimeters square), after conditioning in an oven at 70° C. for 30 minutes. The odor level is evaluated by five panelists and is rated in five grades according to the following criteria. The result of the evaluation is an average value. The film sample has a rating of 2.

1: Very weak odor (almost odorless)
2: Weak odor (slightly smells)
3: Intermediate odor (apparently smells)
4: Strong odor (strongly smells)
5: Very strong odor (intolerably smells)

EXAMPLE 2

A polypropylene homopolymer in the form of powder is prepared by slurry polymerization (in heptane) using the same titanium trichloride-organoaluminum catalyst as in Example 1. This homopolymer (100 parts by weight) is incorporated with 0.05 parts by weight of calcium stearate, 0.20 parts by weight of "Irganox 1010" (trade name), and 0.20 parts by weight of "Ultranox 626" (trade name of (2,4-di-t-butylphenyl)pentaerythritol diphosphite, made by Borg-Warner Co.). The resulting composition is pelletized using a vented extruder (40 mm in diameter). The pelletized composition has an MFR$_0$ of 0.5 g/10 min.

The pellets undergo repeated pelletization twice at 280° C. in the same manner as in Example 1. The k value after repeated pelletization is 2.9.

The pellets of the composition before the repeated pelletization are dried under reduced pressure in a large-size drier at 130° C. for 6 hours. The dried pellets are extruded at a stock temperature of 280° C. from a 60-mm extruder equipped with a T-die. The extrudate is cooled and solidified with a first cooling roll at 60° C. and a second cooling roll at 20° C., both equipped with an air-knife. Thus there is obtained a 0.8-mm thick sheet.

This sheet is examined for volatile substances in the same manner as in Example 1. There is obtained a gas chromatogram as shown in FIG. 2. The content of heptane in the sheet sample is 0.78 ppm and the content of 2,4-dimethyl-heptene-1 is 1.8 ppm, and the total amount of volatile components is 21.5 ppm. The rating of odor is 2.2.

EXAMPLE 3

An ethylene-propylene random copolymer (containing 4.0 wt % of ethylene) in the form of powder is prepared by slurry polymerization (in heptane) using the same titanium trichloride-organoaluminum catalyst as in Example 1. After drying at 120° C. for 8 hours under reduced pressure, 100 parts by weight of this copolymer is incorporated with 0.05 parts by weight of calcium stearate, 0.20 parts of BHT, and 0.10 parts by weight of "Irganox 1010". The resulting composition is pelletized using a vented extruder (40 mm in diameter). The pelletized composition has an MFR$_0$ of 5.3 g/10 min.

The pellets undergo repeated pelletization twice at 280° C. in the same manner as in Example 1. The k value after repeated pelletization is 1.7.

There is obtained a 30-μm thick undrawn film using a 50-mm extruder equipped with a T-die in the same manner as in Example 1.

This film is examined for volatile substances in the same manner as in Example 1. There is obtained a gas chromatogram as shown in FIG. 3. The content of heptane in the film sample is 0.66 ppm and the content of 2,4-dimethyl-heptene-1 is 0.40 ppm, and the total amount of volatile components is 12 ppm. The rating of odor is 1.4.

COMPARATIVE EXAMPLE 1

Figure 4:
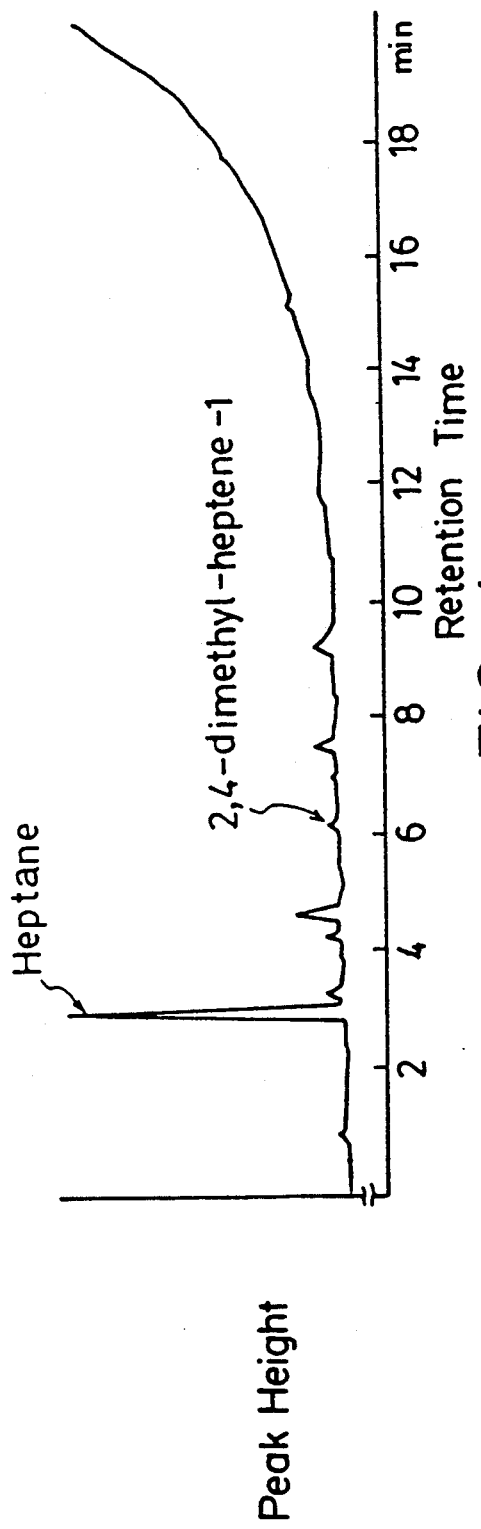
FIG. 4 is a gas chromatogram obtained in Comparative Example 1.

The same procedure as in Example 1 is repeated to give a 30-μm thick undrawn film, except that the pellets are not dried. This film gives a chromatogram as shown in FIG. 4.

The content of heptane in the film sample is 18 ppm and the content of 2,4-dimethyl-heptene-1 is 1.2 ppm, and the total amount of volatile components is 37 ppm. The rating of odor is 4.6.

COMPARATIVE EXAMPLE 2

Figure 5:
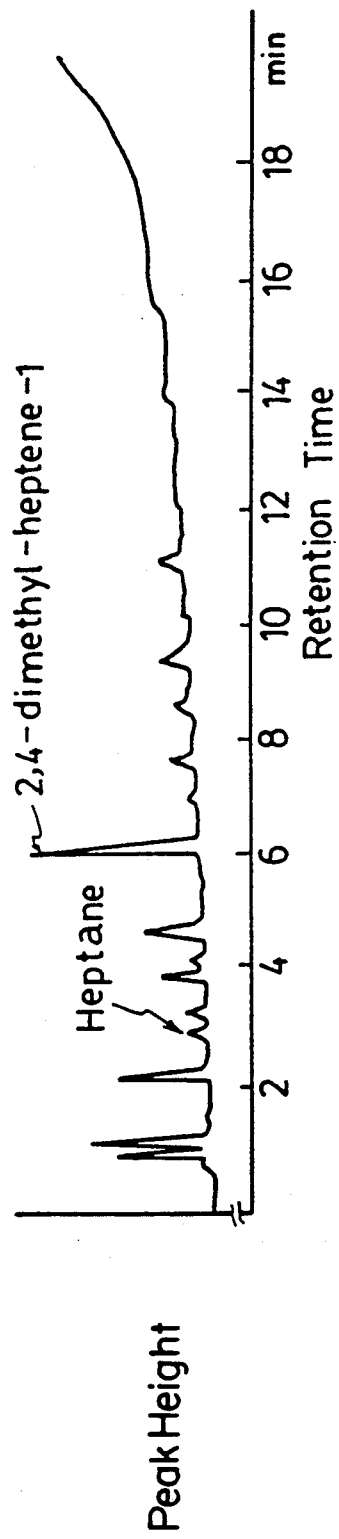
FIG. 5 is a gas chromatogram obtained in Comparative Example 2.

The same procedure as in Example 1 is repeated to give a 30-μm thick undrawn film, except that 100 parts by weight of propylene homopolymer powder is incorporated with 0.05 parts by weight of calcium stearate, 0.03 parts by weight of "Irganox 1010", and 0.03 parts by weight of "Phosphite 168". This film gives a chromatogram as shown in FIG. 5.

The pelletized composition has an MFR$_0$ of 3.5 g/10 minutes, and the k value is 6.0 after repeated pelletization (twice) at 280° C. The content of heptane in the film sample is 0.71 ppm and the content of 2,4-dimethyl-heptene-1 is 6.4 ppm, and the total amount of volatile components is 31.2 ppm. The rating of odor is 4.4.

COMPARATIVE EXAMPLE 3

Figure 6:
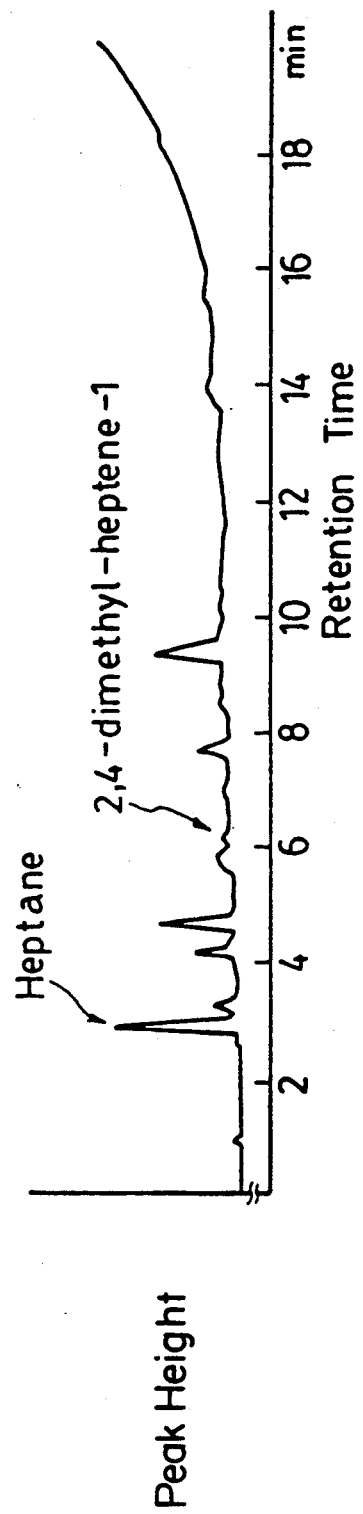
FIG. 6 is a gas chromatogram obtained in Comparative Example 3.

The same procedure as in example 3 is repeated to give a 30-μm thick undrawn film, except that the ethylene-propylene random copolymer powder is dried at 120° C. for 1 hour under reduced pressure. This film gives a chromatogram as shown in FIG. 6.

The pelletized composition has an $MFR_0$ of 5.2 g/10 minutes, and the k value is 1.8 after repeated pelletization (twice) at 280° C. The content of heptane in the film sample is 5.4 ppm and the content of 2,4-dimethyl-heptene-1 is 0.62 ppm, and the total amount of volatile components is 28 ppm. The rating of odor is 4.2.

EFFECT OF THE INVENTION

As mentioned above, the present invention provides a polypropylene molded article which has a greatly lowered level of odor and hence is suitable for food packaging.

What is claimed is:

1. A polypropylene molded article having therein volatile components which include a content of hexane, heptane or a mixture thereof, and a content of 2,4-dimethyl-1-heptene, wherein:

the total content of hexane, heptane or the mixture thereof is 0.1 to 5 ppm;

the content of 2,4-dimethyl-1-heptane therein is 0.1 to 5 ppm; and the total amount of volatile components therein is 1 to 30 ppm.

2. A polypropylene molded article as recited in claim 1, wherein the total content of hexane, heptane or the mixture thereof is 0.1 to 3 ppm.

3. A polypropylene molded article as recited in claim 1, wherein the content of 2,4-dimethyl-1-heptene is 0.1 to 3 ppm.

4. A polypropylene molded article as recited in claim 4, wherein the total amount of volatile componesnts therein is 1 to 25 ppm.

5. A polypropylene molded article, having therein a content of hexane, heptane or a mixture thereof; and a content of 2,4-dimethyl-1-heptene; wherein:

the total content of hexane, heptane or the mixture thereof is 0.1 to 5 ppm; the content of 2,4-dimethyl-1-heptene therein is 0.1 to 5 ppm; the total amount of volatile components therein is 1 to 30 ppm; and a value as expressed in the following formula of less than 5.0, $$k = MFR_2/MFR_0$$

wherein, $MFR_0$ is the melt flow rate of the polypropylene after a single pelletization at 280° C. and $MFR_2$ is the melt flow rate of the polypropylene after repeated pelletization (twice) at 280° C.

* * * * *